United States Patent

Herd

Patent Number: 5,093,484
Date of Patent: Mar. 3, 1992

[54] POLAZO REACTIVE DYESTUFFS

[75] Inventor: Karl J. Herd, Odenthal, Fed. Rep. of Germany

[73] Assignee: Bayer Aktiengesellschaft, Leverkusen, Fed. Rep. of Germany

[21] Appl. No.: 196,168

[22] Filed: May 18, 1988

[30] Foreign Application Priority Data

May 27, 1987 [DE] Fed. Rep. of Germany ....... 3717814

[51] Int. Cl.$^5$ .................. C09B 62/513; D06P 1/384
[52] U.S. Cl. ................................. 534/642
[58] Field of Search ....................... 534/642

[56] References Cited

U.S. PATENT DOCUMENTS

| 4,029,597 | 6/1977 | Neisius et al. | 534/642 X |
| 4,430,259 | 2/1984 | Mischke et al. | 534/642 |
| 4,652,634 | 3/1987 | Mischke et al. | 534/642 |

FOREIGN PATENT DOCUMENTS

| 1106244 | 3/1968 | United Kingdom | 534/642 |
| 1302519 | 1/1973 | United Kingdom | 534/642 |

OTHER PUBLICATIONS

Chemical Abstracts, Band 106, Nr. 4, Jan. 1987, Seite 64, Zusammenfassung Nr. 19942n, Columbus, Ohio, U.S.; & JP-A-60 130 652 (Mitsui Toatsu Chemicals, Inc.) 12-07-1985.

Primary Examiner—Mary C. Lee
Assistant Examiner—Fiona T. Powers
Attorney, Agent, or Firm—Sprung Horn Kramer & Woods

[57] ABSTRACT

A polyazo reactive dyestuff of the formula

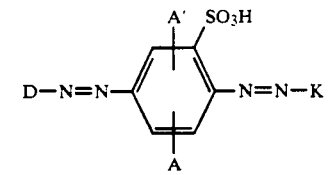

wherein
D = the radical of a diazo component of the formulae

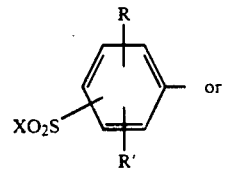 or

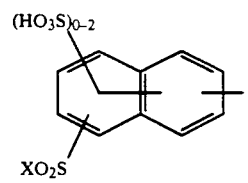

A and A' = H, $C_1$-$C_4$-alkyl, $C_1$-$C_4$-alkoxy or halogen,
R and R' = H, $C_1$-$C_4$-alkyl, $C_1$-$C_4$-alkoxy, halogen, $CO_2H$ or $SO_3H$,
X = —CH=$CH_2$ or —$CH_2$—$CH_2$—Y,
wherein
Y = a radical which can be eliminated under alkaline conditions and
K = the radical of a coupling component of the pyridone, pyrazolone, pyrazolopyridone, acetoacetic acid arylide, N-(3-aminophenyl)acetamide, 3-aminophenylureido, naphthylamine, naphthol or naphtholamine series, it being possible for the radical K to contain further azo groups or radicals containing azo groups and further fibre-reactive radicals.

6 Claims, No Drawings

POLAZO REACTIVE DYESTUFFS

The invention relates to polyazo reactive dye-stuffs of the formula (1)

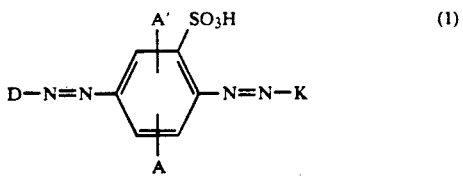

wherein
D = the radical of a diazo component of the formulae

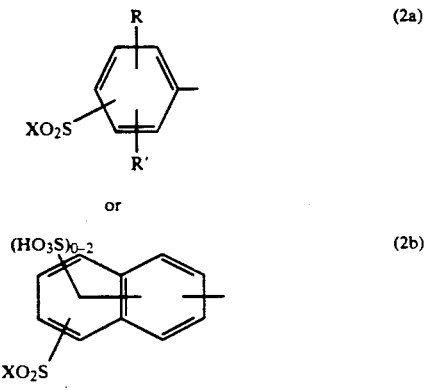

A and A′ = H, $C_1$-$C_4$-alkyl, $C_1$-$C_4$-alkoxy or halogen,
R and R′ = H, $C_1$-$C_4$-alkyl, $C_1$-$C_4$-alkoxy, halogen, $CO_2H$ or $SO_3H$,
X = —CH=$CH_2$ or —$CH_2$—$CH_2$—Y,
wherein
Y = a radical which can be eliminated under alkaline conditions and
K = the radical of a coupling component of the pyridone, pyrazolone, pyrazolopyridone, acetoacetic acid arylide, N-(3-aminophenyl)acetamide, 3-aminophenylureido, naphthylamine, naphthol or naphtholamine series, it being possible for the radical K to contain further azo groups or radicals containing azo groups and further fibre-reactive radicals.

Examples of the radical Y are: $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2$—$C_6H_4$—$CH_3$ or $N(CH_3)_3$+Cl−.

The $C_1$-$C_4$-alkyl and $C_1$-$C_4$-alkoxy radicals mentioned can be either branched or straight-chain.

Examples of the coupling components HK on which the radicals K are based are: 6-hydroxy-2-pyridones, citrazinic acid derivatives, pyrazolo[3,4-b]pyridine-3,6-diones, 1-aryl-substituted 3-methyl(3-carboxy)-5-hydroxypyrazoles, 1- and 2-aminonaphthalene-mono- and -disulphonic acids, 1- and 2-naphthol-mono- and -disulphonic acids, amino- and acylamino-substituted 1-naphthol-mono- and -disulphonic acids and 7-arylazo-8-amino-1-naphthol-3,5(3,6)disulphonic acids.

The radicals K can contain the customary substituents, in particular sulphonic acid or carboxyl groups. Examples of suitable substituents are methyl, ethyl, methoxy, ethoxy, acetylamino, benzoylamino, mesylamino, amino, chlorine, bromine, ureido, hydroxyl, sulphomethyl, phenyl, benzyl, phenylamino and aminocarbonyl, and amino- and aminoalkyl substituents which carry fibre-reactive radicals. The radical K, and likewise the radical D can additionally be substituted by an $SO_2X$ grouping.

A large number of suitable fibre-reactive radicals are described in the literature. Examples which may be mentioned are: 2,4-dichlorotriazin-6-yl and monohalogeno-sym.-triazinyl radicals, in particular monochloro- and monofluorotriazinyl radicals, which are substituted by amino, monoalkylamino, dialkylamino, arylamino, aralkylamino, alkoxy or aryloxy, aryl preferably denoting optionally substituted phenyl or naphthyl and alkyl denoting optionally substituted $C_1$-$C_4$-alkyl, and preferred substituents being carboxyl, sulpho or sulphato.

Mono-, di- or trihalogenopyrimidinyl radicals, such as 2,4-dichloropyrimidin-6-yl-, 2,4,5-trichloropyrimidin-6-yl-, 2,6-dichloropyrimidin-4-yl-carbonyl-, 2,5-dichloropyrimidin-5-yl-carbonyl-, 2-fluoro-4-pyrimidinyl, 2,6-difluoro-5-methyl-4-pyrimidinyl-, 2,6-difluoro-5-chloro-4-pyrimidinyl-, 2-fluoro-6-methyl-5-chloro-4-pyrimidinyl-, 2,5,6-trifluoro-4-pyrimidinyl-, 5-chloro-6-chloromethyl-2-fluoro-4-pyrimidinyl-, 5-chloro-6-dichloromethyl-2-fluoro-4-pyrimidinyl-, 5-chloro-6-trichloromethyl-2-fluoro-4-pyrimidinyl-, 5-chloro-2-trichloromethyl-6-fluoro-4-pyrimidinyl-, 5-chloro-2-fluorodichloromethyl-6-fluoro-4-pyrimidinyl-, 2-fluoro-5-chloro-4-pyrimidinyl-, 2-fluoro-6-phenyl-4-pyrimidinyl-, 6-fluoro-5-chloro-2-methyl-4-pyrimidinyl-, 2-methylsulphonyl-6-methyl-4-pyrimidinyl- and 2,3-dichloroquinoxaline-6-carbonyl.

Suitable diazo components on which the radicals D are based are, for example: aniline-4-β-sulphatoethyl sulphone, aniline-4-β-thiosulphatoethyl sulphone, aniline-4-vinyl sulphone, aniline-4-β-chloroethyl sulphone, aniline-3-β-sulphatoethyl sulphone, aniline-3-vinyl sulphone, 2-methoxy-aniline-5-β-sulphatoethyl sulphone, 2-methoxyaniline-5-β-thiosulphatoethyl sulphone, 2-methoxyaniline-5-vinyl sulphone, 4-methoxy-aniline-3-β-sulphatoethyl sulphone, 4-methoxy-aniline-3-β-vinyl sulphone, 2,5-dimethoxyaniline-4-β-sulphatoethyl sulphone, 2,5-dimethoxyaniline-4-vinyl sulphone, 2,5-dichloro-aniline-4-β-sulphatoethyl sulphone, 2-methoxy-5-methyl-aniline-4-β-sulphatoethyl sulphone, aniline-2-β-sulphatoethyl sulphone, 2-chloroaniline-5-β-sulphatoethyl sulphone, 4-chloroaniline-3-β-sulphatoethyl sulphone, 3-(3- or 4-aminobenzoyl)-aminophenyl-β-sulphatoethyl sulphone, 2-methoxy-5-methyl-aniline-4-vinyl sulphone, 6-carboxyaniline-3-β-sulphatoethyl sulphone, 6-carboxy-aniline-3-vinyl sulphone, 2-sulphoaniline-4-β-sulphatoethyl sulphone, 2-sulphoaniline-4-vinyl sulphone, 2,4-disulphoaniline-5-vinyl sulphone, 2-naphthylamine-8-β-sulphatoethyl sulphone, 2-naphthylamine-6-β-sulphatoethyl sulphone, 1-sulpho-2-naphthylamine-6-β-sulphatoethyl sulphone, 1-naphthylamine-4-β-sulphatoethyl sulphone, 1-sulpho-2 -naphthylamine-5-β-sulphatoethyl sulphone, 6-sulpho-2-naphthylamine-8-β-sulphatoethyl sulphone, 2-amino-3-sulpho-naphthalene-6,8-bis-(β-sulphatoethyl sulphone), 2-bromo-1-aminobenzene-4-β-sulphatoethyl sulphone, 2,6-dichloro-1-aminobenzene-4-β-sulphatoethyl sulphone, 1-naphthylamine-5-β-sulphatoethyl sulphone, 2-naphthylamine-5-β-sulphatoethyl sulphone, 2-naphthylamine-8-β-sulphatoethyl sulphone and 8-sulpho-2-naphthylamine-6-β-sulphatoethyl sulphone.

Preferred dyestuffs (1) are those of the formula

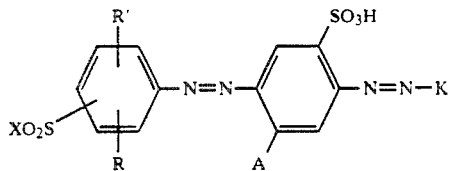

(3)

in particular those wherein

A = H, $CH_3$, Cl or $OCH_3$,

R and R' = H, Cl, $OCH_3$ or $SO_3H$,

X = $CH_2CH_2OSO_3H$ or $CH=CH_2$ and

K =

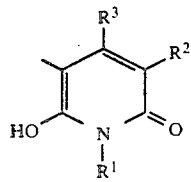

wherein $R^1$ = H, $C_1$-$C_4$-alkyl, $CH_2CH_2SO_3H$, $CH_2CH_2OSO_3H$, aryl or —$(CH_2)_{2-3}$—NHZ, $R^2$ = H, Cl, $SO_3H$, $CONH_2$, $CH_2SO_3H$, CN or $SO_2CH_3$, $R^3$ = H, $C_1$-$C_4$-alkyl, $CH_2SO_3H$, aryl, $CO_2H$, $CO_2CH_3$ or $CONH_2$ and Z = H, acyl, benzoyl or a fibre-reactive heterocyclic radical, or

K =

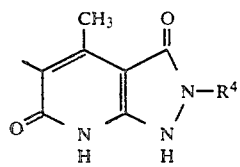

wherein $R^4$ = H, $C_1$-$C_4$-alkyl, phenyl, $CH_2CH_2OSO_3H$ or p-$C_6H_4$-$SO_3H$, or

K =

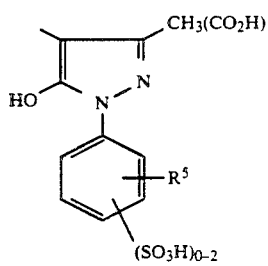

wherein $R^5$ = H, CL, $CH_3$, $OCH_3$ or NHZ, or

K =

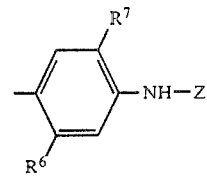

wherein $R^6$ = ureido, $NHCOCH_3$, $NHCOC_6H_5$ or $NHSO_2CH_3$ and $R^7$ = H, $CH_3$, $OCH_3$ or $SO_3H$, or

K =

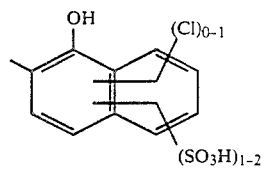

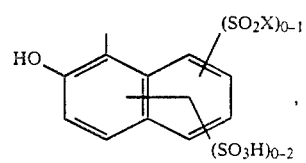

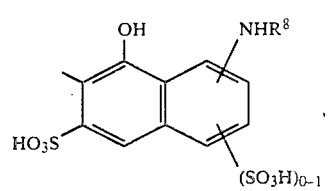

wherein $R^8$ = $C_1$-$C_4$-alkyl, phenyl, aminobenzoyl or Z, or

K =

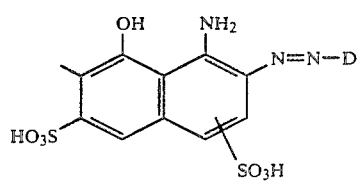

wherein aryl = optionally substituted phenyl (preferred substituents are Cl, $C_1$-$C_4$-alkyl, $SO_3H$, COOH and $C_1$-$C_4$-alkoxy) and acyl preferably represents $C_1$-$C_4$-alkylcarbonyl or optionally substituted phenylcarbonyl. Particularly preferred dyestuffs are those of the following formulae:

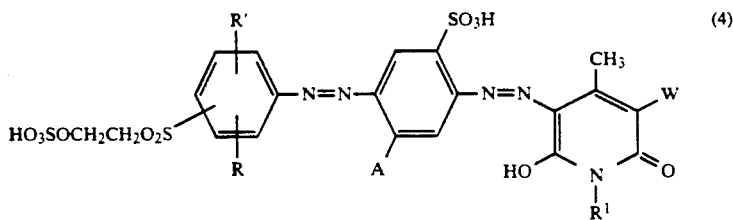
(4)
wherein
W=H, SO₃H or CH₂SO₃H, with W=H, SO₃H or CH₂SO₃H,
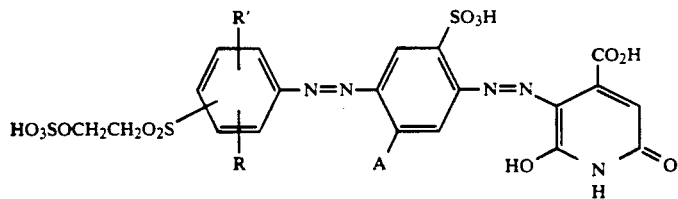
(5)
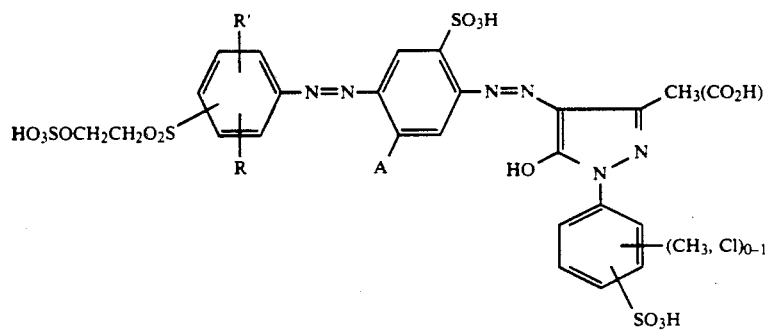
(6)
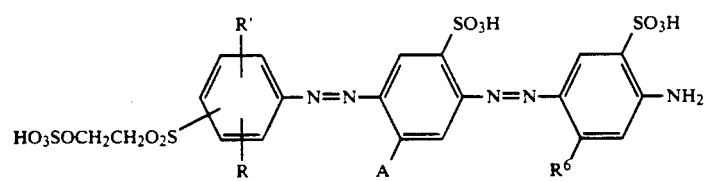
(7)
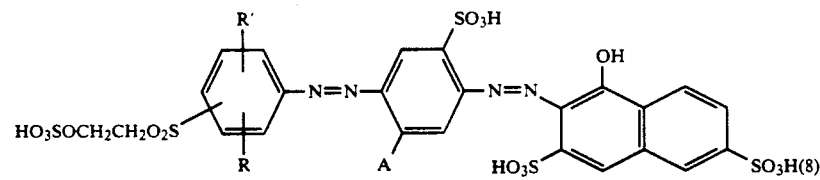
(8)
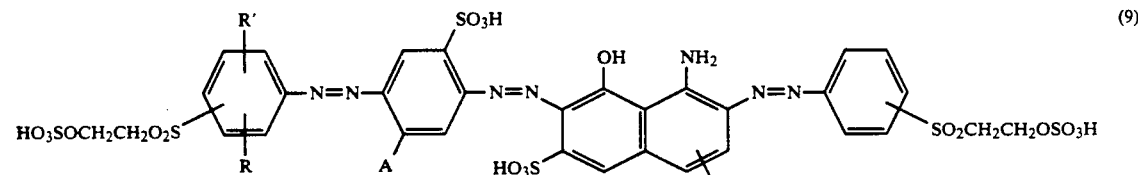
(9)
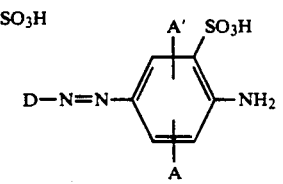
(10)
The polyazo reactive dyestuffs according to the invention are prepared in the customary manner by a process in which aminoazo compounds of the formula (10)
in which
D, A and A' have the meaning given under formula (1), are diazotized and the diazotization products are coupled with a coupling component HK to give (1).

Dyestuffs of the formula (1) in which X represents a β-hydroxyethyl group can also be converted into the corresponding dyestuffs (1) where $X=CH_2CH_2OSO_3H$ with the aid of a sulphating agent or into corresponding dyestuffs (1) where $X=CH_2CH_2OPO_3H_2$ with the aid of a phosphating agent.

The invention also relates to aminoazo compounds of the structure (10) - with the exception of 4'-(β-sulphatoethylsulphonyl)-3-sulpho-4-aminoazobenzene - and to processes for their preparation.

Aminoazo compounds with the structure

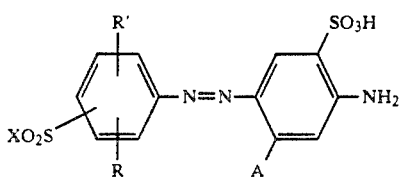

wherein
X, R' and R have the meaning given under formula (1) and
$A = C_1-C_4$-alkyl, $C_1-C_4$-alkoxy or halogen,
are preferred.

Aminoazo compounds of the structure (11) wherein
$X=CH=CH_2$, $CH_2-CH_2OSO_3H$ or $CH_2-CH_2$-$SSO_3H$,
R and $R'=H$, Cl, $OCH_3$ or $SO_3H$ and
$A=CH_3$, Cl or $OCH_3$,
are particularly preferred.

The process according to the invention for the preparation of the new intermediate compounds (10) where $X=CH_2CH_2OSO_3H$, $-CH=CH_2$ or $-CH_2CH_2$-$SSO_3H$, which in turn are themselves useful monoazo reactive dyestuffs, comprises a procedure in which known diazo components of the structure

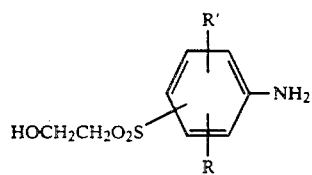

or

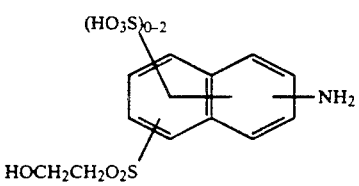

are diazotized and the diazotization products are coupled to aniline derivatives of the structure

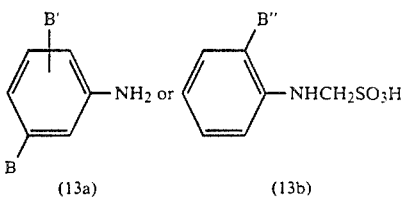

wherein
$B=C_1-C_4$-alkyl, $C_1-C_4$-alkoxy or halogen,
$B'=H$, $C_1-C_4$-alkyl $C_1-C_4$-alkoxy or halogen,
$B''=H$, $C_1-C_4$-alkyl or $C_1-C_4$-alkoxy and
the p-position relative to the amine function in (13a) is unsubstituted, and, in the case of the resulting aminoazo compounds of the formula

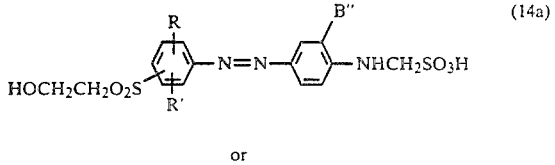

or

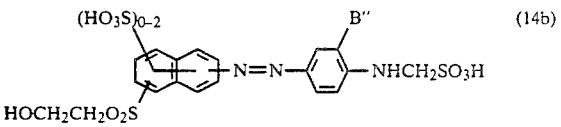

the sulphomethyl protective group is split off again by alkaline hydrolysis, and the aminoazo compounds thereafter available, of the formula

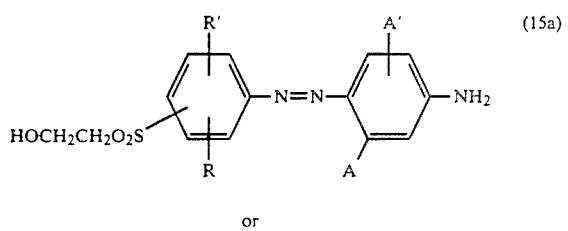

or

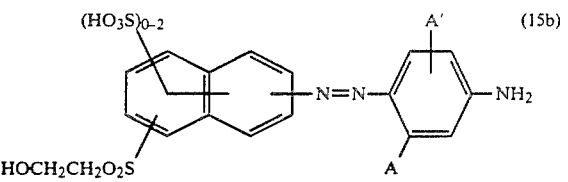

are simultaneously sulphated on the hydroxyethyl grouping and sulphonated in the o-position relative to the free amino function with the aid of a sulphonating reagent, such as, for example, oleum, at 20°-80° C. The sulphatoethylsulphonyl grouping can then also be converted into the vinylsulphonyl or thiosulphatoethylsulphonyl grouping by known methods.

Aminoazo compounds of the formula (10) where $A=C_1-C_4$-alkyl or $C_1-C_4$-alkoxy can also be prepared by direct diazotization of corresponding diazo components $D-NH_2$ and coupling of the diazotization products to the chosen o-sulphoanilines of the structure

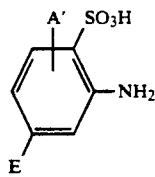

wherein

E=$C_1$-$C_4$-alkyl or $C_1$-$C_4$-alkoxy and

A'=H, $C_1$-$C_4$-alkyl, $C_1$-$C_4$-alkoxy and halogen.

Selected examples of the new aminoazo compounds are: 2'-(β-sulphatoethylsulphonyl)-3-sulpho-4-aminoazobenzene, 3'-(β-sulphatoethylsulphonyl)-3-sulpho-4-aminoazobenzene, 2',5'-dichloro-4'-(β-sulphatoethylsulphonyl)-3-sulpho-4-aminoazobenzene, 4'-methoxy-3'-(β-sulphatoethylsulphonyl)-3-sulpho-4-aminoazobenzene, 4'-vinylsulphonyl-2',3-disulpho-4-aminoazobenzene, 4'-chloro-3'-(β-sulphatoethylsulphonyl)-3-sulpho-4-aminoazobenzene, 2'-(β-sulphatoethylsulphonyl)-6-methyl-3-sulpho-4-aminoazobenzene, 3'-(β-sulphatoethylsulphonyl)-6-methyl-3-sulpho-4-aminoazobenzene, 4'-(β-sulphatoethylsulphonyl)-6-methyl-3-sulpho-4-aminoazobenzene, 2',5'-dichloro-4'-(β-sulphatoethylsulphonyl)-6-methyl-3-sulpho-4-aminoazobenzene, 2'-chloro-5'-(β-sulphatoethylsulphonyl)-6-methyl-3-sulpho-4-aminoazobenzene, 4'-(β-sulphatoethylsulphonyl)-2,6-dimethyl-3-sulpho-4-aminoazobenzene, 4'-(β-sulphatoethylsulphonyl)-6-chloro-5-methyl-3-sulpho-4-aminoazobenzene, 4'-(β-sulphatoethylsulphonyl)-5-chloro-2-methyl-3-sulpho-4-aminoazobenzene, 4'-(β-sulphatoethylsulphonyl)-6-chloro-3-sulpho-4-aminoazobenzene, 3'-(β-sulphatoethylsulphonyl)-6-chloro-3-sulpho-4-aminoazobenzene, 2',5',6-trichloro-4'-(β-sulphatoethylsulphonyl)-3-sulpho-4-aminoazobenzene, 3'-(β-sulphatoethylsulphoyl)-6',3-disulpho-6-chloro-4-aminoazobenzene, 3'-(β-sulphatoethylsulphonyl)-6-methoxy-3-sulpho-4-aminoazobenzene, 3',4'-bis-(β-sulphatoethylsulphonyl)-6-methoxy-3-sulpho-4-aminoazobenzene, 4'-(β-sulphatoethylsulphonyl)-6-methoxy-3-sulpho-4-aminoazobenzene, 2',5'-dichloro-4'-(β-sulphatoethylsulphonyl)-6-methoxy-3-sulpho-4-aminoazobenzene, 4'-(β-sulphatoethylsulphonyl)-2-methyl-5-methoxy-3-sulpho-4-aminoazobenzene, 4'-(β-sulphatoethylsulphonyl)-2,5-dimethoxy-3-sulpho-4-aminoazobenzene, 3'-(β-sulphatoethylsulphonyl)-2,5-dimethoxy-3-sulpho-4-aminoazobenzene, 2',5'-dichloro-4'-(β-sulphatoethylsulphonyl)-2,5-diethoxy-3-sulpho-4-aminoazobenzene, 2-(4'-amino-3'-sulphophenylazo)-6-(β-sulphatoethylsulphonyl)-naphthalene, 2-(4'-amino-6'-methyl-3'-sulphophenylazo)-1-sulpho-6-(β-sulphatoethylsulphonyl)-naphthalene, 2-(4'-amino-6'-methyl-3'-sulphophenylazo)-6-(β-sulphatoethylsulphonyl)-naphthalene, 2-(4'-amino-3'-sulphophenylazo)-8-sulpho-6-(β-sulphatoethylsulphonyl)-naphthalene and 2-(4'-amino-6'-methyl-3'-sulphophenylazo)-1,7-disulpho-5-(β-sulphatoethylsulphonyl)-naphthalene.

The reactive dyestuffs of the formula (1) according to the invention are suitable for dyeing and printing the most diverse materials, such as silk, leather, wool and polyamide fibres, but in particular cellulose-containing materials, such as linen, cellulose, regenerated cellulose and above all cotton. They are suitable both for the exhaustion process and for the pad-dyeing process, in which the goods are impregnated with aqueous and, if appropriate, also salt-containing dyestuff solutions and the dyestuffs are fixed after treatment with an alkali or in the presence of an alkali, if necessary under the influence of heat.

The reactive dyestuffs of the formula (1) are particularly suitable for dyeing cotton by the exhaustion process and the cold pad-batch process, the difference between the degree of exhaustion and degree of fixing being remarkably small, that is to say the hydrolysis proportion is very low. The dyestuffs are outstandingly water-soluble and give dyeings with a good to very good fastness level.

The formulae given are those of the free acids; the salts, in particular the alkali metal salts, such as the sodium, potassium or lithium salts, are in general obtained in the preparation.

The $\lambda_{max}$ values quoted in the following examples were all determined in water as the solvent.

EXAMPLE 1

320 g of 4'-(β-hydroxyethylsulphonyl)-2-methyl-4-aminoazobenzene are introduced into 600 ml of 20% strength oleum such that the temperature does not rise above 30° C. The mixture is stirred at room temperature for 2 hours and the clear solution which has meanwhile formed is then stirred at 60° C. for 4 hours. If the sulphonation reaction is still incomplete at this point in time, it can be completed by addition of 50 ml of 65% strength oleum. The reaction solution is cooled to 20° C. and discharged onto a mixture of 500 ml of water/2 kg of ice. The 4'-(β-sulphatoethylsulphonyl)-2-methyl-5-sulpho-4-aminoazobenzene which has precipitated out is filtered off with suction and washed with saturated sodium chloride solution until largely free from acid. The orange-red paste can be used directly for the diazotization.

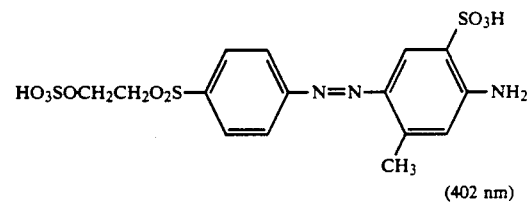

(402 nm)

EXAMPLE 2

116 g of the moist paste (43% strength) of Example 1 are stirred into 400 ml of water, 50 g of ice are added and diazotization is carried out with 25 ml of a 30% strength aqueous sodium nitrite solution. After the mixture has been stirred at 15°-20° C. for 1 hour, the excess nitrite is removed with amidosulphonic acid. 30 g of 3-aminocarbonyl-1,4-dimethyl-5-sulphomethyl-6-hydroxy-2-pyridone (Na salt) are added to this diazonium salt solution and the pH of the coupling mixture is brought to 7.0 with sodium carbonate solution. The mixture is subsequently stirred for 1 hour at pH 6.5-7.5 and the product is salted out with 60 g of sodium chloride and isolated by filtration with suction. The dyestuff paste is dried. The red dyestuff powder, to which the structure

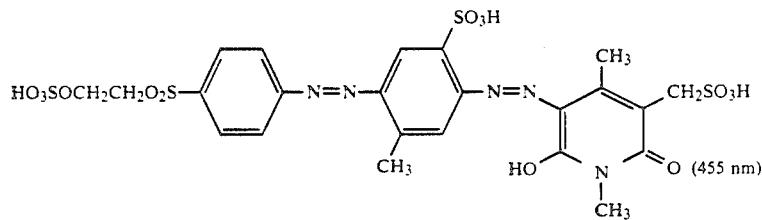

is attributed, dyes cotton in a brilliant orange-yellow colour shade with a high level of fastness.

EXAMPLE 3

If citrazinic acid is used as the coupling component analogously to Example 2, a dyestuff of the structure

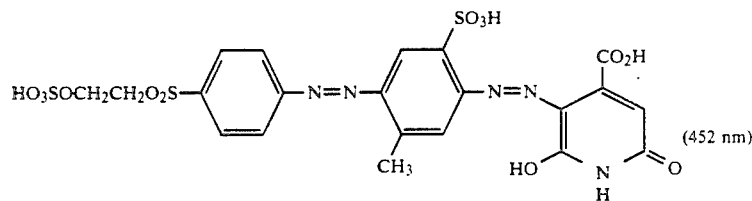

which dyes cotton in a brilliant orange shade, is obtained.

EXAMPLE 4

If the pyridone coupling component in Example 2 is replaced by 4-methyl-2-(4'-sulphophenyl)-2,3-dihydropyrazolo[3,4-b]pyridine-3,6-dione and the procedure is analogous, a dark brown dyestuff powder of the formula

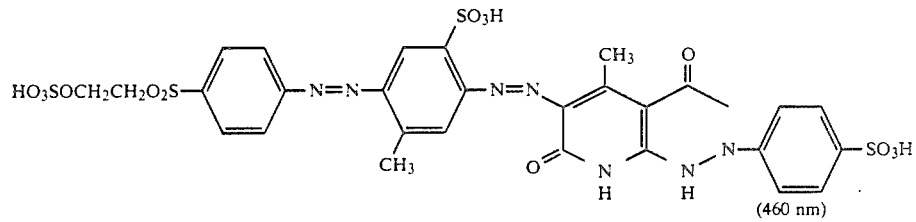

which dyes cotton in deep brown shades, is obtained.

The following reactive dyestuffs are accessible by the route described by varying the substituents in the diazo component, the central component and the pyridone coupling component:

| Example | D | A | $R^1$ | $R^2$ | $R^3$ | Colour shade |
|---------|---|---|-------|-------|-------|--------------|
| 5 | X—SO₂—⟨phenyl⟩— | H | $CH_3$ | $CH_2SO_3H$ | $CH_3$ | yellowish-tinged orange |
| 6 | ⟨2,5-dichlorophenyl with XO₂S⟩ | H | $CH_3$ | $CH_2SO_3H$ | $CH_3$ | golden yellow |

(X = CH₂CH₂OSO₃H)

-continued

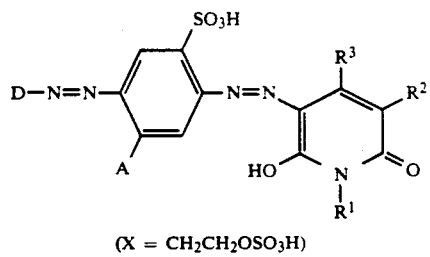

(X = CH₂CH₂OSO₃H)

| Example | D | A | R¹ | R² | R³ | Colour shade |
|---|---|---|---|---|---|---|
| 7 | XO₂S— (meta-phenyl) | CH₃ | CH₃ | SO₃H | CH₃ | orange |
| 8 | XO₂S— (para-phenyl) | CH₃ | CH₂CH₂—SO₃H | H | CH₃ | golden yellow |
| 9 | " | OCH₃ | CH₃ | CH₂SO₃H | CH₃ | orange |
| 10 | XO₂S—, SO₃H phenyl | CH₃ | C₂H₅ | CONH₂ | CH₃ | orange |
| 11 | Cl, XO₂S phenyl | CH₃ | CH₃ | H | CO₂H | yellowish-tinged orange |

EXAMPLE 12

34 g of 3'-(β-hyroxyethylsulphonyl)-2-chloro-4-aminoazobenzene are introduced into 60 ml of 20% strength oleum at 15°–20° C. and the mixture is stirred for 1 hour. 40 ml of 65% strength oleum are then added, whereupon the temperature rises to about 30°–35° C. The reaction mixture is stirred at 35° C. for 3 hours and discharged onto 500 g of ice and the dyestuff which has precipitated, of the structure

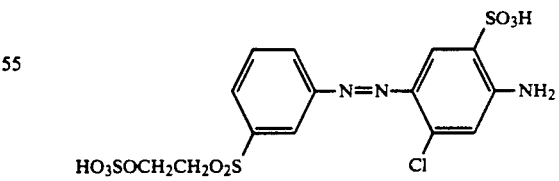

is isolated.

EXAMPLE 13

The paste isolated from Example 12 is diazotized analogously to Example 2 and coupled to 3-methyl-1-(4'-sulphophenyl)-5-hydroxypyrazole under neutral conditions. The dyestuff thus obtained, of the structure

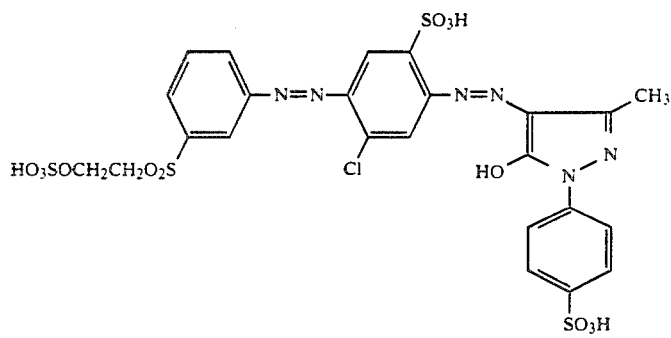
dyes cotton in a brilliant orange shade with good fastnesses. The following pyrazolone dyestuffs are obtained completely analogously:
EXAMPLE 14
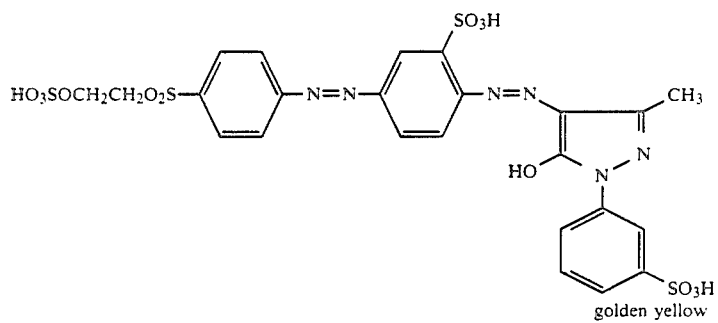
golden yellow
EXAMPLE 15
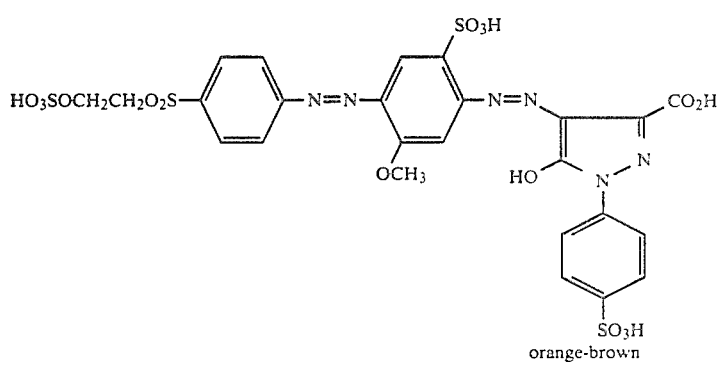
orange-brown
EXAMPLE 16
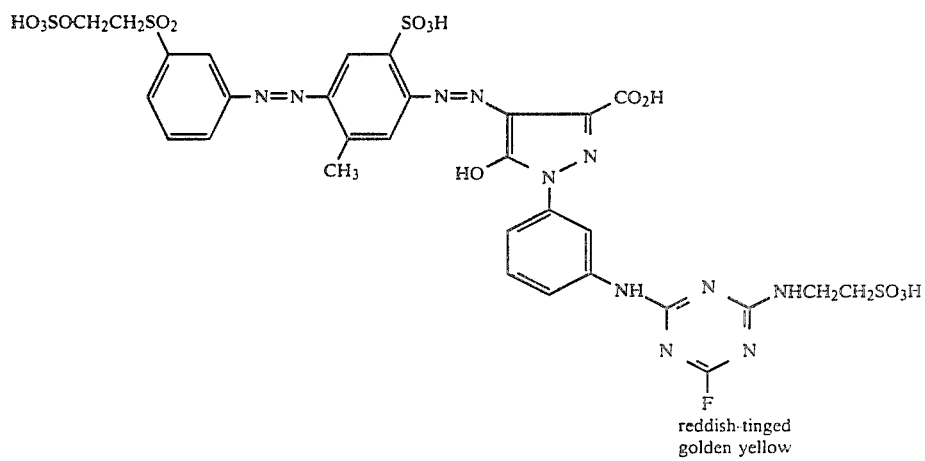
reddish-tinged golden yellow

EXAMPLES 17 and 18

If the diazo component from Example 1 is coupled to

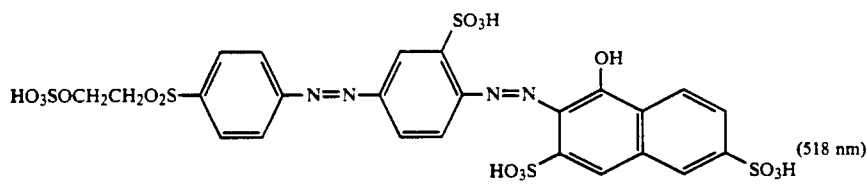
(518 nm)

(3-amino-4-sulphophenyl)urea or 4-acylamino-2-aminobenzenesulphonic acid, the following diazo dyestuffs are obtained:

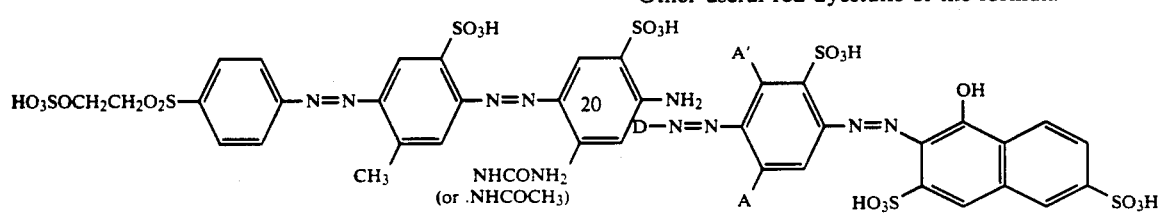

EXAMPLE 19

Coupling of the aminoazo compound of Example 1 to (3-aminophenyl)urea and condensation of the resulting diazo dyestuff with 3-(3',5'-dichlorotriazinylamino)benzenesulphonic acid gives a bifunctional reactive dyestuff of the structure

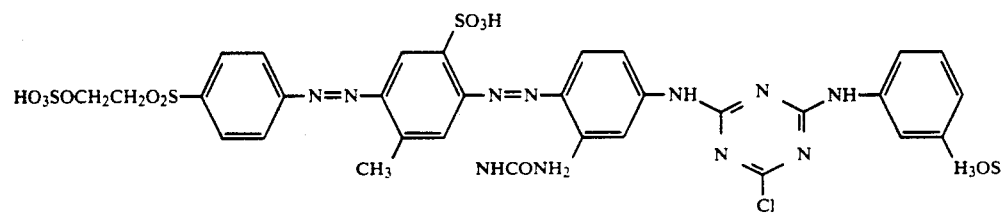

which gives very fast orange prints on cotton.

EXAMPLE 20

300 g of thoroughly dried 4'-(β-hydroxyethylsulphonyl)-4-aminoazobenzene are introduced in portions into 600 ml of 65% strength oleum, with external cooling, such that the temperature does not rise above 25° C.; the reaction mixture is stirred at 35°–40° C. for 4 hours and, when sulphonation is complete, is discharged onto about 2.5 kg of ice. The aminoazo compound which has precipitated out, of the structure

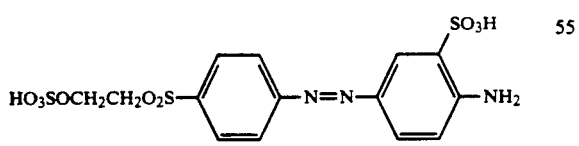

is filtered off with suction, washed with saturated sodium chloride solution and further reacted directly as a paste.

EXAMPLE 21

If the aminoazo compound of Example 20 is diazotized analogously to the instructions from Example 2 and the product is coupled to 1-naphthol-3,5-disulphonic acid at pH 6, salting out, filtration with suction and drying results in a dyestuff powder of the structure which gives a strong brilliant bluish-tinged red dyeing with excellent fastnesses to light and oxidation on cotton.

Other useful red dyestuffs of the formula

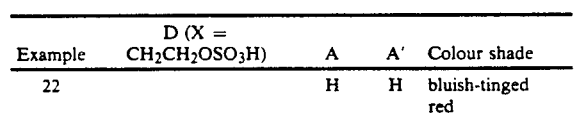

are possible by varying the aminoazo compound.

| Example | D (X = CH$_2$CH$_2$OSO$_3$H) | A | A' | Colour shade |
|---|---|---|---|---|
| 22 | | H | H | bluish-tinged red |
| 23 | | Cl | H | bluish-tinged red |
| 24 | | CH$_3$ | H | bluish-tinged red (520 nm) |
| 25 | | CH$_3$ | H | bluish-tinged red (516 nm) |

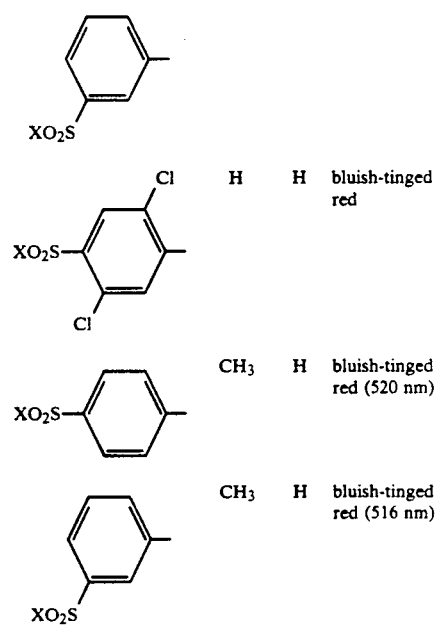

-continued

| Example | D (X = CH₂CH₂OSO₃H) | A | A' | Colour shade |
|---|---|---|---|---|
| 26 | ![Cl, XO₂S, Cl substituted benzene] | CH₃ | H | bluish-tinged red |
| 27 | ![XO₂S-phenyl] | Cl | H | red |
| 28 | " | CH₃ | CH₃ | ruby (518 nm) |
| 29 | ![XO₂S-m-phenyl] | Cl | H | red |

-continued

| Example | D (X = CH₂CH₂OSO₃H) | A | A' | Colour shade |
|---|---|---|---|---|
| 30 | ![Cl, XO₂S, Cl substituted benzene] | Cl | H | bluish-tinged red |
| 31 | ![XO₂S-phenyl] | OCH₃ | H | ruby |

If the procedure is analogous to Example 20 using the corresponding coupling components, the dyestuffs of Examples 32 to 34 are obtained:

EXAMPLE 32

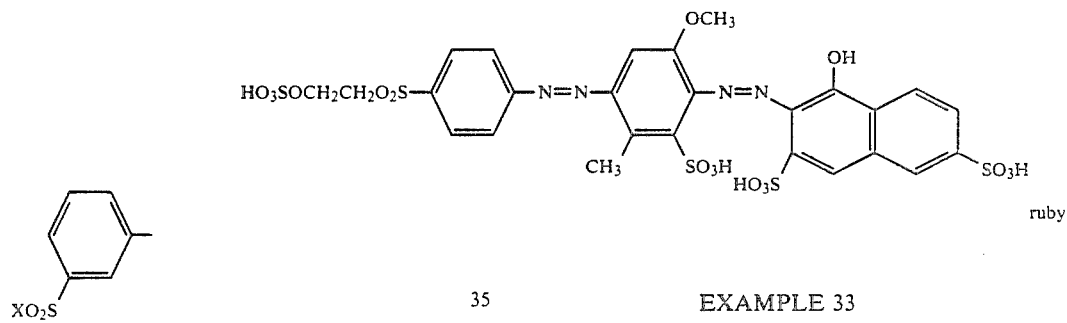

ruby

EXAMPLE 33

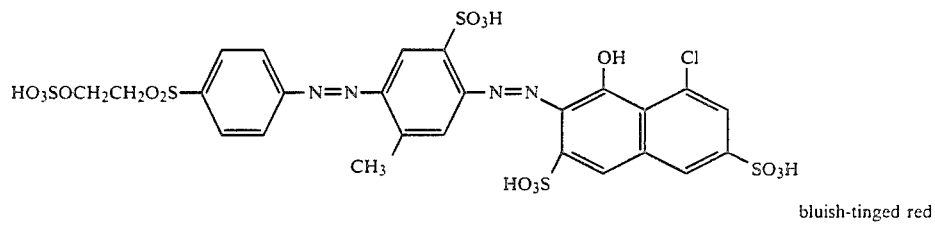

bluish-tinged red

EXAMPLE 34

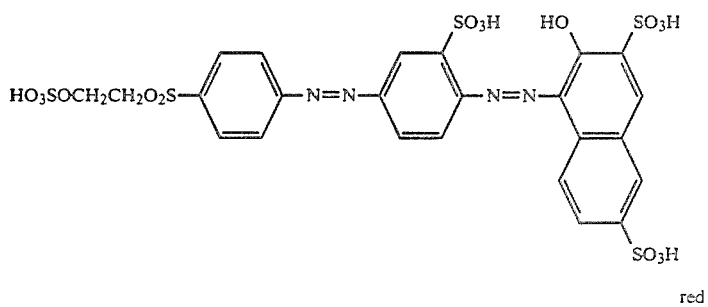

red

EXAMPLE 35

50 g of the dyestuff of the structure

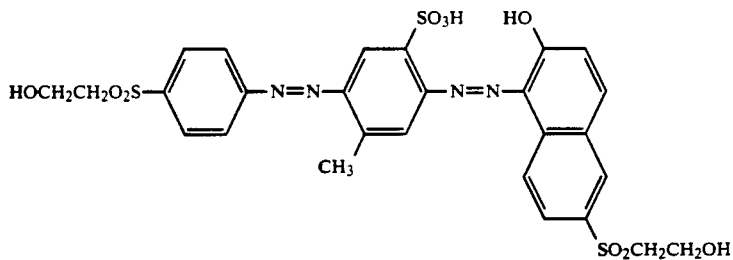

which is prepared by diazotization of 4-(β-hydroxyethylsulphonyl)-aniline and coupling of the diazotization product to 2-amino-4-methylbenzenesulphonic acid, further diazotization of the aminoazo compound and a second coupling of the diazotization product to 6-(β-hydroxyethylsulphonyl)-2-naphthol, are introduced into 100 ml of 98% strength sulphuric acid and the mixture is stirred at room temperature for 2 hours and discharged onto 500 g of ice. The precipitate is filtered off with suction, rinsed twice with 100 ml of saturated sodium chloride solution and dried. 82 g of a salt-containing dark red dyestuff of the formula

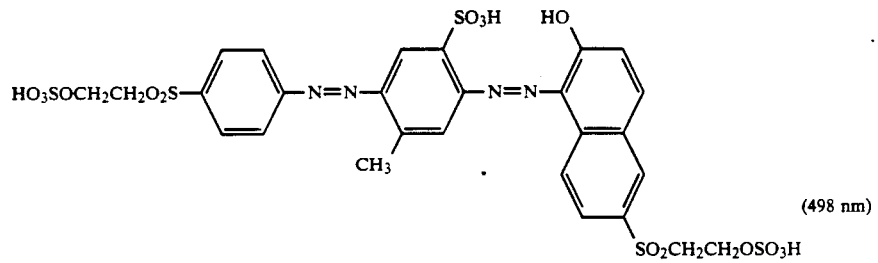

(498 nm)

which dyes cotton in a brilliant red shade are obtained.

Other interesting reactive dyestuffs which are obtained completely analogously are the following:

EXAMPLE 36

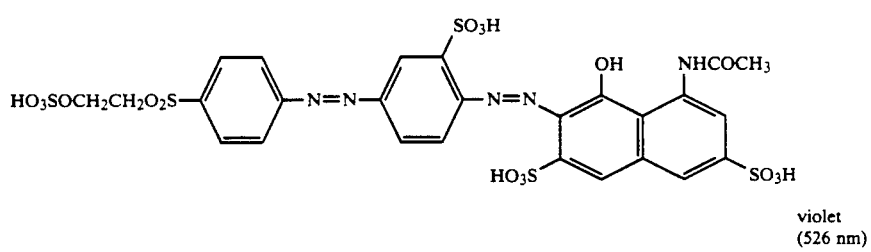

violet
(526 nm)

EXAMPLE 37

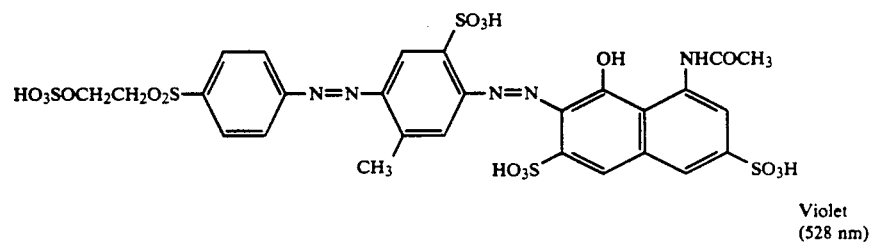

Violet
(528 nm)

EXAMPLE 38
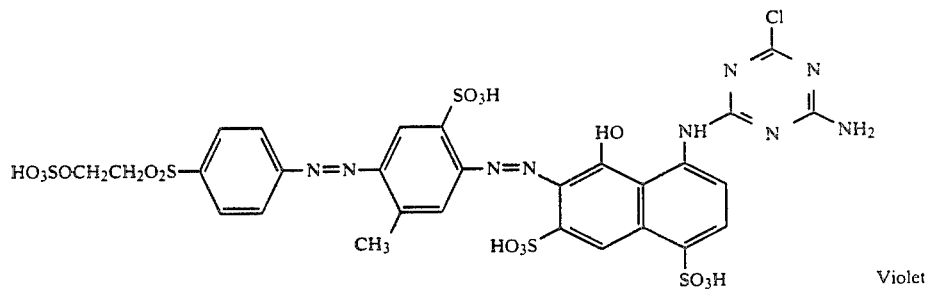
Violet
EXAMPLE 39
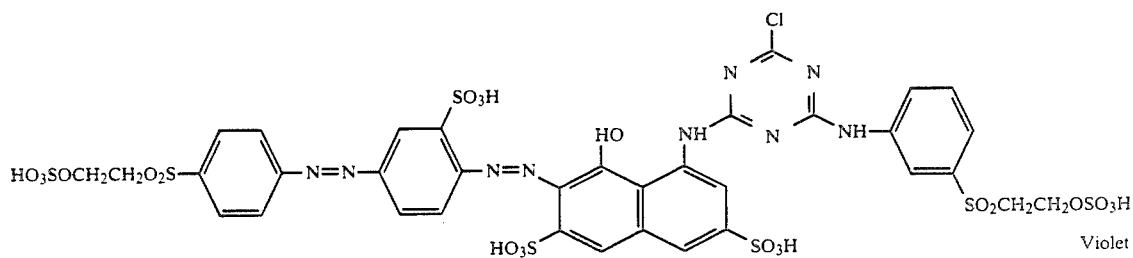
Violet
EXAMPLE 40
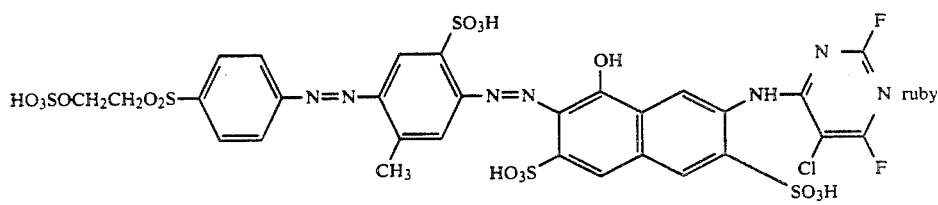
ruby
EXAMPLE 41
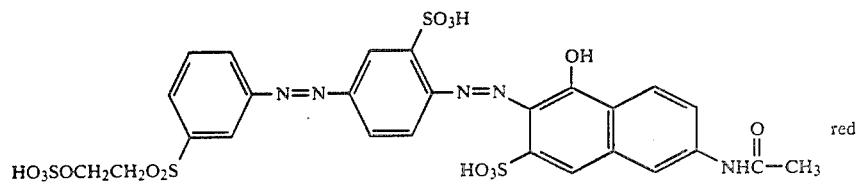
red
EXAMPLE 42
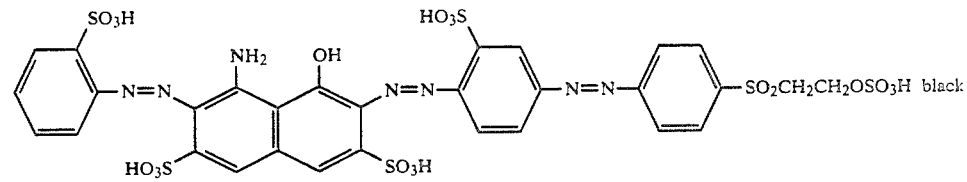
black
EXAMPLE 43
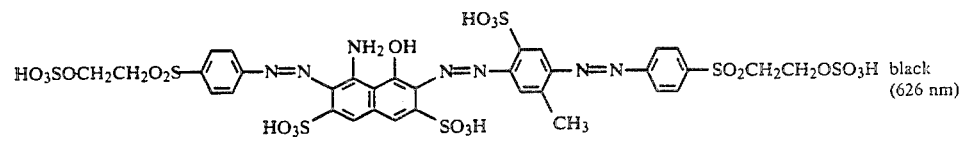
black
(626 nm)

EXAMPLE 44

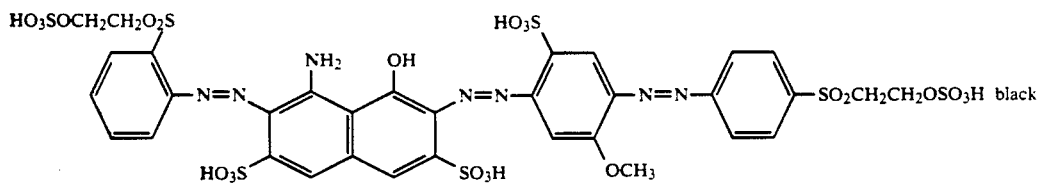 black

EXAMPLE 45

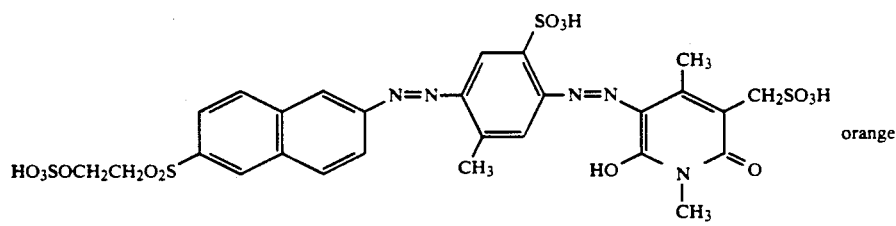 orange

EXAMPLE 46

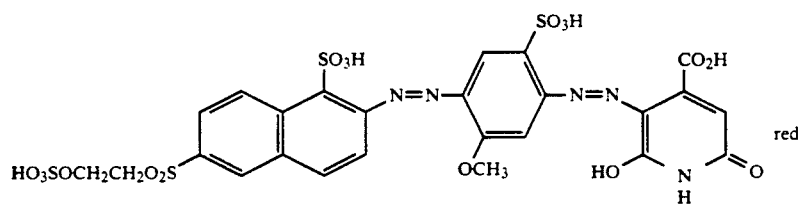 red

EXAMPLE 47

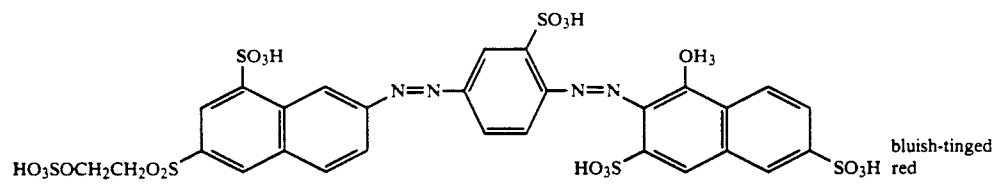 bluish-tinged red

I claim:
1. A polyazo reactive dyestuff of the formula

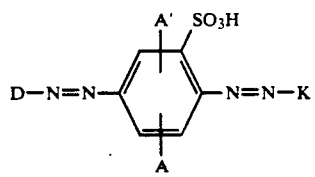

wherein
D = the radical of a diazo component of the formulae

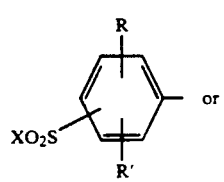 or

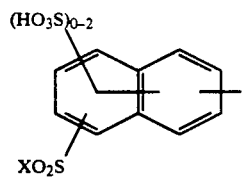

A and A' = H, $C_1$-$C_4$-alkyl, $C_1$-$C_4$-alkoxy or halogen,
R and R' = H, $C_1$-$C_4$-alkyl, $C_1$-$C_4$-alkoxy, halogen, $CO_2H$ or $SO_3H$,
X = —CH=CH$_2$ or —CH$_2$—CH$_2$—Y,
wherein
Y = a radical which is eliminated under alkaline conditions and
K = the radical of a coupling component selected from the group consisting of pyridone, acetoacetic acid arylide, naphthylamine, naphthol and naphtholamine or the radical K contains further azo groups or radicals containing azo groups and further fibre-reactive radicals.

2. A dyestuff of claim 1 of the formula

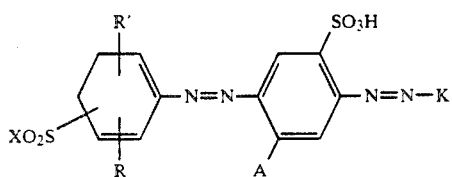

3. A dyestuff of claim 2, wherein
A = H, $CH_3$, Cl or $OCH_3$,
R and R' = H, Cl, $OCH_3$ or $SO_3H$,
X = $CH_2CH_2OSO_3H$ or $CH=CH_2$ and

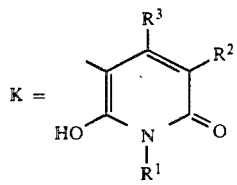

wherein
$R^1$ = H, $C_1$-$C_4$-alkyl, $CH_2CH_2SO_3H$, $CH_2CH_2OSO_3H$, aryl or —$(CH_2)_{2-3}$—NHZ,
$R^2$ = H, Cl, $SO_3H$, $CONH_2$, $CH_2SO_3H$, CN or $SO_2CH_3$,
$R^3$ = H, $C_1$-$C_4$-alkyl, $CH_2SO_3H$, aryl, $CO_2H$, $CO_2CH_3$ or $CONH_2$ and
Z = H, acyl, benzoyl or a fibre-reactive heterocyclic radical.

4. A dyestuff of claim 1, wherein

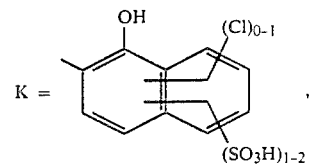

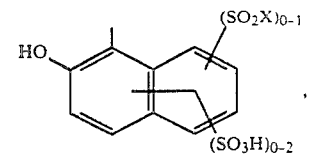

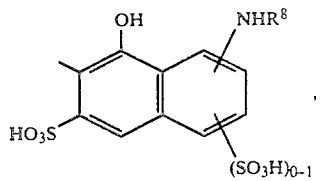

wherein
$R^8$ = $C_1$-$C_4$-alkyl, phenyl, aminobenzoyl or Z, or
K =

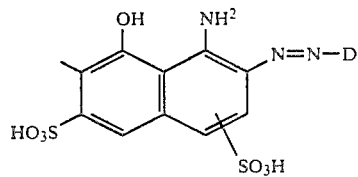

5. A dyestuff of claim 1 of the formula

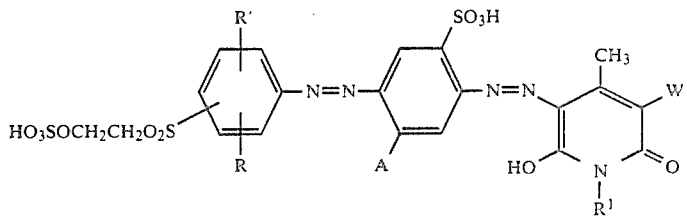

wherein
W = H, $SO_3H$ or $CH_2SO_3H$, and

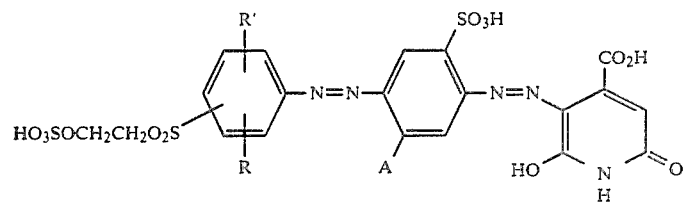

6. A dyestuff of claim 1 of the formula

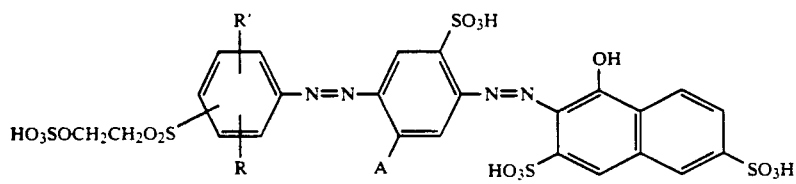
or
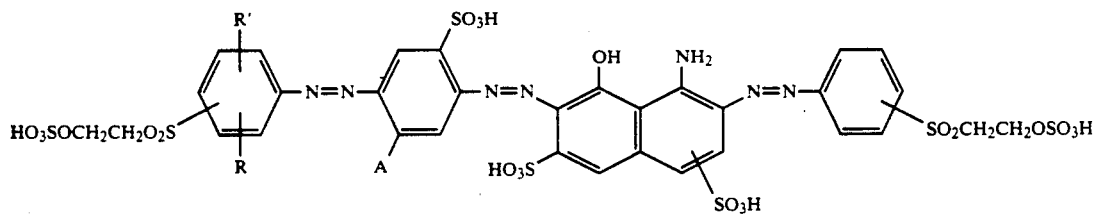
* * * * *

UNITED STATES PATENT AND TRADEMARK OFFICE
CERTIFICATE OF CORRECTION

PATENT NO. : 5,093,484

DATED : March 3, 1992

INVENTOR(S) : Karl J. Herd

It is certified that error appears in the above-identified patent and that said Letters Patent is hereby corrected as shown below:

Col. 12, line 35   Delete "

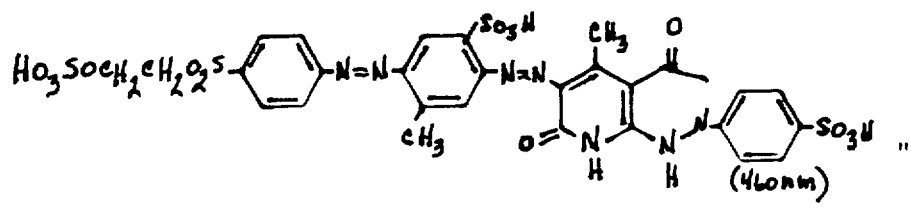

"

and substitute

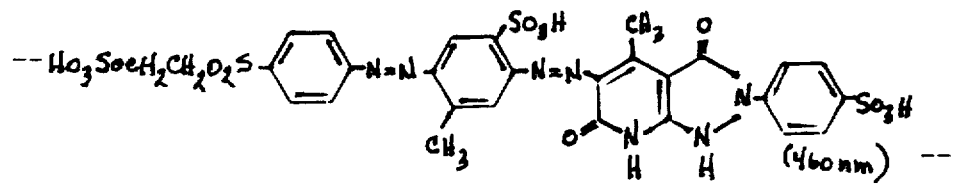

Col. 17, line 20   Delete "

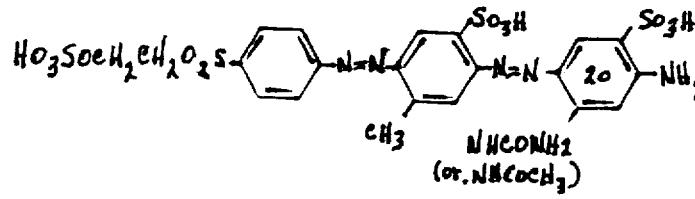

"

and substitute

UNITED STATES PATENT AND TRADEMARK OFFICE
CERTIFICATE OF CORRECTION

PATENT NO. : 5,093,484                                    Page 2 of 3
DATED      : March 3, 1992
INVENTOR(S): Karl J. Herd It is certified that error appears in the above-identified patent and that said Letters Patent is hereby corrected as shown below:

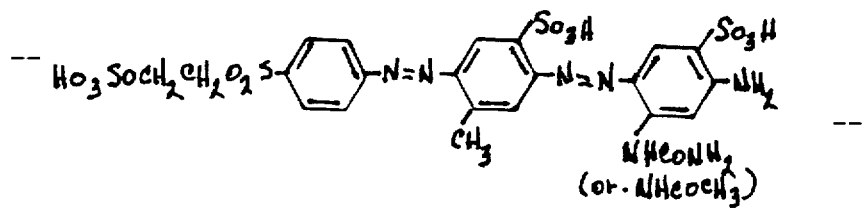

Col. 17, line 35   Delete "

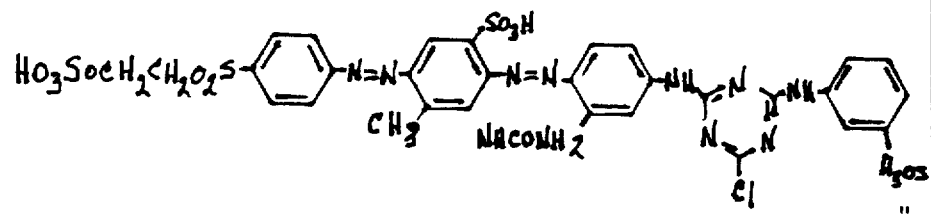
"

and substitute

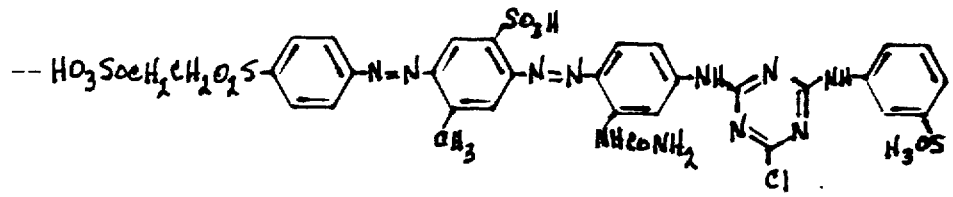

UNITED STATES PATENT AND TRADEMARK OFFICE
CERTIFICATE OF CORRECTION

PATENT NO. : 5,093,484

DATED : March 3, 1992

INVENTOR(S) : Karl J. Herd

It is certified that error appears in the above-identified patent and that said Letters Patent is hereby corrected as shown below:

Col. 27, line 5   Delete " 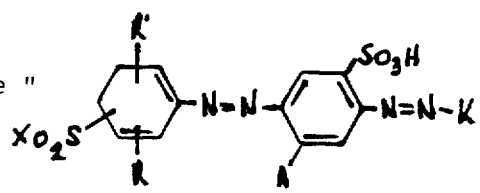 " and substitute

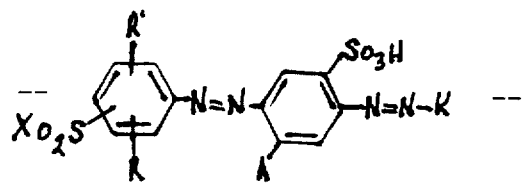 --

Signed and Sealed this

Thirty-first Day of August, 1993

Attest:

BRUCE LEHMAN

Attesting Officer     Commissioner of Patents and Trademarks